United States Patent
Weber et al.

(10) Patent No.: US 10,352,176 B2
(45) Date of Patent: Jul. 16, 2019

(54) COOLING CIRCUITS FOR A MULTI-WALL BLADE

(71) Applicant: General Electric Company, Schenectady, NY (US)

(72) Inventors: David Wayne Weber, Simpsonville, SC (US); Gregory Thomas Foster, Greer, SC (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 15/334,474

(22) Filed: Oct. 26, 2016

(65) Prior Publication Data
US 2018/0112541 A1   Apr. 26, 2018

(51) Int. Cl.
*F01D 5/18* (2006.01)
*F01D 5/14* (2006.01)
(Continued)

(52) U.S. Cl.
CPC ............. *F01D 5/187* (2013.01); *F01D 5/147* (2013.01); *F01D 9/041* (2013.01); *F02C 3/04* (2013.01); *F05D 2220/32* (2013.01); *F05D 2240/122* (2013.01); *F05D 2240/304* (2013.01); *F05D 2240/35* (2013.01); *F05D 2250/185* (2013.01); *F05D 2260/202* (2013.01); *F05D 2260/205* (2013.01)

(58) Field of Classification Search
CPC .......... F01D 5/187; F01D 5/147; F01D 9/041; F02C 3/04; F05D 2220/32; F05D 2240/122; F05D 2240/304; F05D 2240/35; F05D 2250/185; F05D 2260/202; F05D 2260/205
See application file for complete search history.

(56) References Cited

U.S. PATENT DOCUMENTS 2,744,723 A * 5/1956 Roush ..................... F01D 5/181
                                                          415/114
3,220,697 A * 11/1965 Smuland ................ F01D 5/187
                                                          416/96 R
(Continued)

FOREIGN PATENT DOCUMENTS

| EP | 1 001 137 A2 | 5/2000 |
|---|---|---|
| EP | 3 112 594 A1 | 1/2017 |
| GB | 2 163 219 A | 2/1986 |

OTHER PUBLICATIONS

U.S. Appl. No. 15/334,483, Office Action dated Jun. 28, 2018, (GEEN-0881-US), 13 pages.
(Continued)

*Primary Examiner* — Carlos A Rivera
*Assistant Examiner* — Eric J Zamora Alvarez
(74) *Attorney, Agent, or Firm* — Dale Davis; Hoffman Warnick LLC (57) ABSTRACT

A trailing edge cooling system for a multi-wall blade, including: a cooling circuit, including: an outward leg extending toward a trailing edge of the multi-wall blade and fluidly coupled to a coolant feed; a return leg extending away from the trailing edge of the multi-wall blade and fluidly coupled to a coolant collection passage; and a turn for coupling the outward leg and the return leg; wherein the outward leg is radially offset from the return leg along a radial axis of the multi-wall blade.

15 Claims, 6 Drawing Sheets

(51) Int. Cl.
*F01D 9/04* (2006.01)
*F02C 3/04* (2006.01)

(56) References Cited

U.S. PATENT DOCUMENTS

| | | | |
|---|---|---|---|
| 3,844,679 A | 10/1974 | Grondahl et al. | |
| 3,849,025 A * | 11/1974 | Grondahl | F01D 5/185 416/96 R |
| 4,021,139 A | 5/1977 | Franklin | |
| 4,302,153 A * | 11/1981 | Tubbs | F01D 5/18 416/96 R |
| 4,684,322 A * | 8/1987 | Clifford | F01D 5/187 415/175 |
| 4,761,116 A | 8/1988 | Braddy et al. | |
| 4,940,388 A | 7/1990 | Lilleker et al. | |
| 5,100,293 A | 3/1992 | Anzai et al. | |
| 5,464,322 A * | 11/1995 | Cunha | F01D 5/187 415/115 |
| 5,536,143 A * | 7/1996 | Jacala | F01D 5/187 416/96 R |
| 5,915,923 A | 6/1999 | Tomita et al. | |
| 5,967,752 A | 10/1999 | Lee et al. | |
| 5,997,251 A | 12/1999 | Lee | |
| 6,099,252 A * | 8/2000 | Manning | F01D 5/187 415/116 |
| 6,227,804 B1 * | 5/2001 | Koga | F01D 5/187 415/115 |
| 6,247,896 B1 * | 6/2001 | Auxier | F01D 5/18 416/97 R |
| 6,499,949 B2 | 12/2002 | Schafrik et al. | |
| 6,547,522 B2 | 4/2003 | Turnquist et al. | |
| 6,547,525 B2 | 4/2003 | Haehnle et al. | |
| 7,435,053 B2 | 10/2008 | Liang | |
| 7,530,789 B1 | 5/2009 | Liang | |
| 7,670,113 B1 | 3/2010 | Liang | |
| 7,682,133 B1 | 3/2010 | Liang | |
| 7,717,675 B1 | 5/2010 | Liang | |
| 7,785,070 B2 * | 8/2010 | Liang | F01D 5/187 416/97 R |
| 7,845,906 B2 | 12/2010 | Spangler et al. | |
| 7,955,053 B1 | 6/2011 | Liang | |
| 7,985,049 B1 | 7/2011 | Liang | |
| 8,047,788 B1 | 11/2011 | Liang | |
| 8,317,472 B1 | 11/2012 | Liang | |
| 8,322,988 B1 | 12/2012 | Downs et al. | |
| 8,398,370 B1 | 3/2013 | Liang | |
| 8,562,295 B1 | 10/2013 | Liang | |
| 8,608,430 B1 | 12/2013 | Liang | |
| 8,628,298 B1 | 1/2014 | Liang | |
| 8,678,766 B1 | 3/2014 | Liang | |
| 8,790,083 B1 | 7/2014 | Liang | |
| 8,864,469 B1 | 10/2014 | Liang | |
| 9,447,692 B1 | 9/2016 | Liang | |
| 9,970,302 B2 * | 5/2018 | Lacy | F01D 5/187 |
| 2005/0058534 A1 * | 3/2005 | Lee | F01D 5/288 415/116 |
| 2008/0050241 A1 | 2/2008 | Liang | |
| 2009/0193657 A1 | 8/2009 | Wilson, Jr. et al. | |
| 2010/0303625 A1 | 12/2010 | Kuhne et al. | |
| 2013/0108471 A1 | 5/2013 | Fujimoto | |
| 2013/0272850 A1 | 10/2013 | Bunker | |
| 2014/0093379 A1 | 4/2014 | Tibbott et al. | |
| 2014/0127013 A1 | 5/2014 | Spangler et al. | |
| 2015/0041590 A1 | 2/2015 | Kirtley et al. | |
| 2015/0044059 A1 | 2/2015 | Wassynger et al. | |
| 2015/0096305 A1 | 4/2015 | Morgan et al. | |
| 2015/0147164 A1 | 5/2015 | Cui et al. | |
| 2015/0252728 A1 | 9/2015 | Veiga | |
| 2015/0345303 A1 * | 12/2015 | Dong | F01D 5/187 60/806 |
| 2016/0169003 A1 | 6/2016 | Wong et al. | |
| 2016/0177741 A1 | 6/2016 | Kirollos et al. | |
| 2017/0234154 A1 | 8/2017 | Downs | |
| 2017/0350259 A1 | 12/2017 | Dutta et al. | |
| 2018/0230815 A1 | 8/2018 | Jones | |

OTHER PUBLICATIONS

U.S. Appl. No. 15/334,585, Office Action dated Jul. 31, 2018, (GEEN-0848-US), 22 pages.
U.S. Appl. No. 15/334,517, Office Action dated Aug. 6, 2018, (GEEN-0851-US), 24 pages.
U.S. Appl. No. 15/334,501, Office Action dated Aug. 10, 2018, (GEEN-0850-US), 17 pages.
U.S. Appl. No. 15/334,450, Office Action dated Aug. 15, 2018, (GEEN-0853-US), 49 pages.
Extended European search report and Written Opinion issued in connection with corresponding EP Application No. 17197310.0 dated Jan. 29, 2018.
Hoskin, R.F., et al., Edge coupon including cooling circuit for airfoil, GE co-pending U.S. Appl. No. 15/334,471, filed Oct. 26, 2016.
Snider, Z.J., et al., Turbine airfoil coolant passage created in cover, GE co-pending U.S. Appl. No. 15/334,483, filed Oct. 26,2016.
Snider, Z.J., et al., Turbine airfoil trailing edge coolant passage created by cover, GE co-pending U.S. Appl. No. 15/334,450, filed Oct. 26, 2016.
Weber, D.W., et al., Cooling circuits for a multi-wall blade, GE co-pending U.S. Appl. No. 15/334,454, filed Oct. 26, 2016.
Weber, D.W., et al., Multi-turn cooling circuits for turbine blades, GE co-pending U.S. Appl. No. 15/334,563, filed Oct. 26, 2016.
Weber, D.W., et al., Partially wrapped trailing edge cooling circuits with pressure side impingements, GE co-pending U.S. Appl. No. 15/334,517, filed Oct. 26, 2016.
Weber, D.W., et al., Partially wrapped trailing edge cooling circuit with pressure side serpentine cavities, GE co-pending U.S. Appl. No. 15/334,501, filed Oct. 26, 2016.
Weber, D.W., et al., Turbomachine blade with trailing edge cooling circuit, GE co-pending U.S. Appl. No. 15/334,448, filed Oct. 26, 2016.
Weber, D.W., et al., Varying geometries for cooling circuits of turbine blades, GE co-pending U.S. Appl. No. 15/334,585, filed Oct. 26, 2016.
U.S. Appl. No. 15/334,563, Office Action dated Dec. 12, 2018, (GEEN-0847-US), 18 pages.
U.S. Appl. No. 15/334,450, Notice of Allowance dated Jan. 10, 2019, (GEEN-0853-US), 12 pages.
U.S. Appl. No. 15/334,501, Notice of Allowance dated Jan. 17, 2019, (GEEN-0850-US), 11 pages.
U.S. Appl. No. 15/334,454, Notice of Allowance dated Jan. 24, 2019, (GEEN-0846-US), 23 pages.
U.S. Appl. No. 15/334,585, Final Office Action dated Feb. 8, 2019, (GEEN-0848-US), 20 pages.
U.S. Appl. No. 15/334,517, Notice of Allowance dated Mar. 20, 2019, (GEEN-0851-US), 9 pgs.
U.S. Appl. No. 15/334,563, Notice of Allowance dated Apr. 9, 2019, (GEEN-0847-US), 8 pgs.

* cited by examiner

COOLING CIRCUITS FOR A MULTI-WALL BLADE

RELATED APPLICATIONS

This application is related to co-pending U.S. application Ser. Nos. 15/334,563, 15/334,454, 15/334,585, 15/334,448, 15/334,501, 15/334,517, 15/334,450, 15/334,471, and 15/334,483, all filed on Oct. 26, 2016.

BACKGROUND OF THE INVENTION

The disclosure relates generally to turbine systems, and more particularly, to cooling circuits for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades and nozzle airfoils, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

A multi-wall blade typically contains an intricate maze of internal cooling passages. Cooling air (or other suitable coolant) provided by, for example, a compressor of a gas turbine system, may be passed through and out of the cooling passages to cool various portions of the multi-wall blade. Cooling circuits formed by one or more cooling passages in a multi-wall blade may include, for example, internal near wall cooling circuits, internal central cooling circuits, tip cooling circuits, and cooling circuits adjacent the leading and trailing edges of the multi-wall blade.

BRIEF DESCRIPTION OF THE INVENTION

A first aspect of the disclosure provides a trailing edge cooling system for a multi-wall blade. The trailing edge cooling system includes: a cooling circuit with an outward leg extending toward a trailing edge of the multi-wall blade and fluidly coupled to an air feed; a return leg extending away from the trailing edge of the multi-wall blade and fluidly coupled to a collection passage; and a turn for coupling the outward leg and the return leg; wherein the outward leg is radially offset from the return leg along a radial axis of the multi-wall blade.

A second aspect of the disclosure provides a multi-wall turbine blade, including: a trailing edge cooling system disposed within the multi-wall turbine blade, the trailing edge cooling system including: a plurality of cooling circuits extending at least partially along a radial length of a trailing edge of the multi-wall blade, each cooling circuit, including: an outward leg extending toward the trailing edge of the multi-wall blade and fluidly coupled to an air feed; a return leg extending away from the trailing edge of the multi-wall blade and fluidly coupled to a collection passage; and a turn for coupling the outward leg and the return leg; wherein the outward leg is radially offset from the return leg along a radial axis of the multi-wall blade.

A third aspect of the disclosure provides turbomachine, including: a gas turbine system including a compressor component, a combustor component, and a turbine component, the turbine component including a plurality of turbine blades, at least one of the turbine blades including a multi-wall blade; and a trailing edge cooling system disposed within the multi-wall blade, the trailing edge cooling system including: a plurality of cooling circuits extending at least partially along a radial length of a trailing edge of the multi-wall blade, each cooling circuit, including: an outward leg extending toward the trailing edge of the multi-wall blade and fluidly coupled to an air feed; a return leg extending away from the trailing edge of the multi-wall blade and fluidly coupled to a collection passage; and a turn for coupling the outward leg and the return leg; wherein the outward leg is radially offset from the return leg along a radial axis of the multi-wall blade, and wherein the outward leg is circumferentially offset relative to the return leg.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure relates generally to turbine systems, and more particularly, to cooling circuits for a multi-wall blade. A multi-wall blade may include, for example, a turbine blade or a nozzle of a turbine system.

According to embodiments, a trailing edge cooling circuit with flow reuse is provided for cooling a multi-wall blade of a turbine system (e.g., a gas turbine system). A flow of cooling air is reused after flowing through the trailing edge cooling circuit. After passing through the trailing edge cooling circuit, the flow of cooling air may be collected and used to cool other sections of the multi-wall blade. For example, the flow of cooling air may be directed to at least one of the pressure or suction sides of the multi-wall blade for convection and/or film cooling. Further, the flow of cooling air may be provided to other cooling circuits within the multi-wall blade, including tip, and platform cooling circuits.

Traditional trailing edge cooling circuits typically eject the flow of cooling air out of a multi-wall blade after it flows through a trailing edge cooling circuit. This is not an efficient use of the cooling air, since the cooling air may not have been used to its maximum heat capacity before being exhausted from the multi-wall blade. Contrastingly, according to embodiments, a flow of cooling air, after passing through a trailing edge cooling circuit, is used for further cooling of the multi-wall blade.

In the Figures (see, e.g., FIG. 10), the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along an axis "r" (see, e.g., FIG. 1), which is substantially perpendicular with axis A and intersects axis A at only one location. Finally, the term "circumferential" refers to movement or position around axis A.

Figure 1:
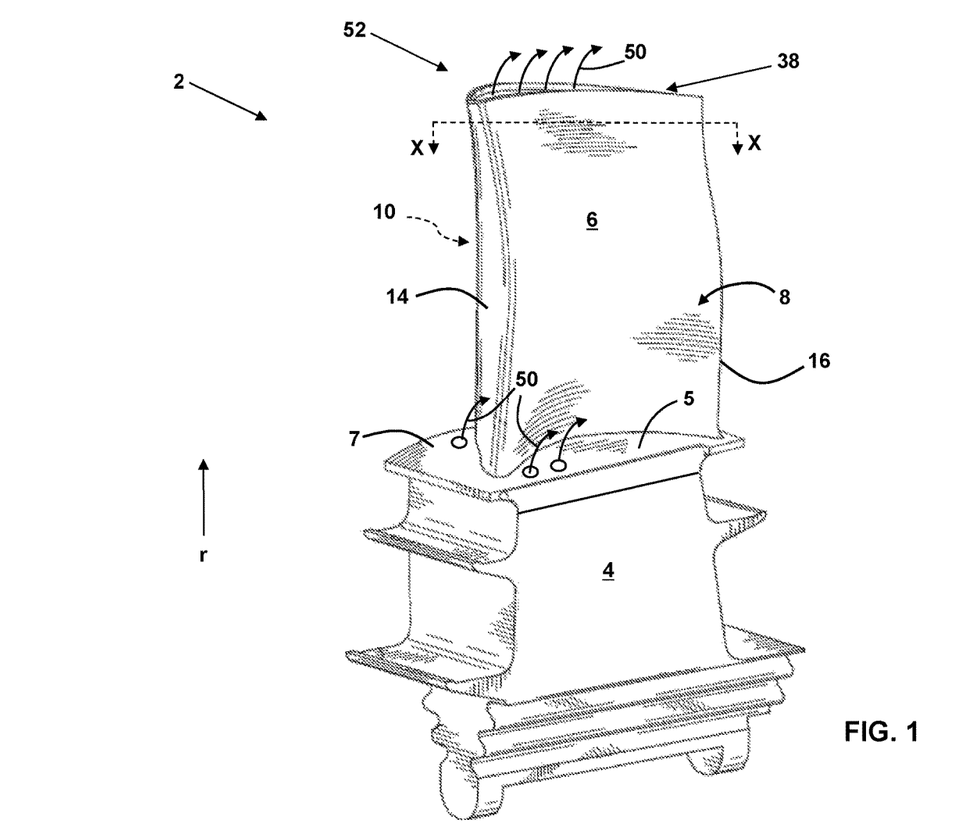
FIG. 1 is a perspective view of a multi-wall blade according to various embodiments.

Turning to FIG. 1, a perspective view of a turbine blade 2 is shown. The turbine blade 2 includes a shank 4 and a multi-wall blade 6 (also referred to as a multi-wall airfoil) coupled to and extending radially outward from the shank 4. The multi-wall blade 6 includes a pressure side 8, an opposed suction side 10, and a tip area 52. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a pressure side platform 5 and a suction side platform 7.

The shank 4 and multi-wall blade 6 may each be formed of one or more metals (e.g., nickel, alloys of nickel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism).

Figure 2:
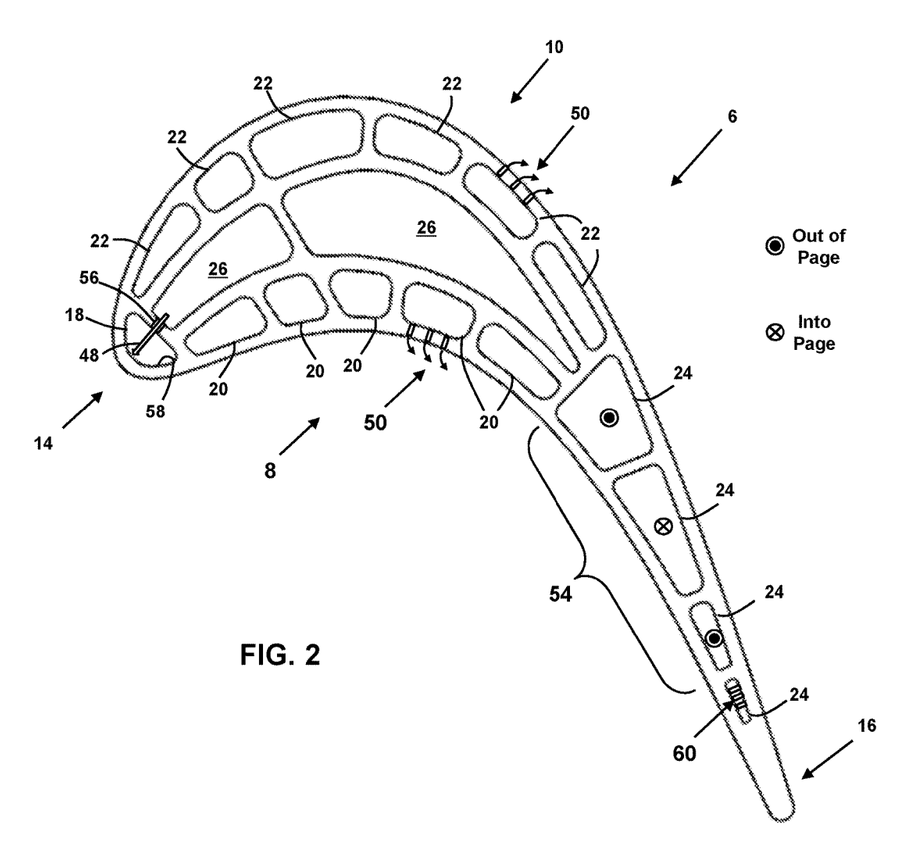
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal passages. In embodiments, the multi-wall blade 6 includes at least one leading edge passage 18, at least one pressure side (near wall) passage 20, at least one suction side (near wall) passage 22, at least one trailing edge passage 24, and at least one central passage 26. The number of passages 18, 20, 22, 24, 26 within the multi-wall blade 6 may vary, of course, depending upon for example, the specific configuration, size, intended use, etc., of the multi-wall blade 6. To this extent, the number of passages 18, 20, 22, 24, 26 shown in the embodiments disclosed herein is not meant to be limiting. According to embodiments, various cooling circuits can be provided using different combinations of the passages 18, 20, 22, 24, 26.

Figure 3:
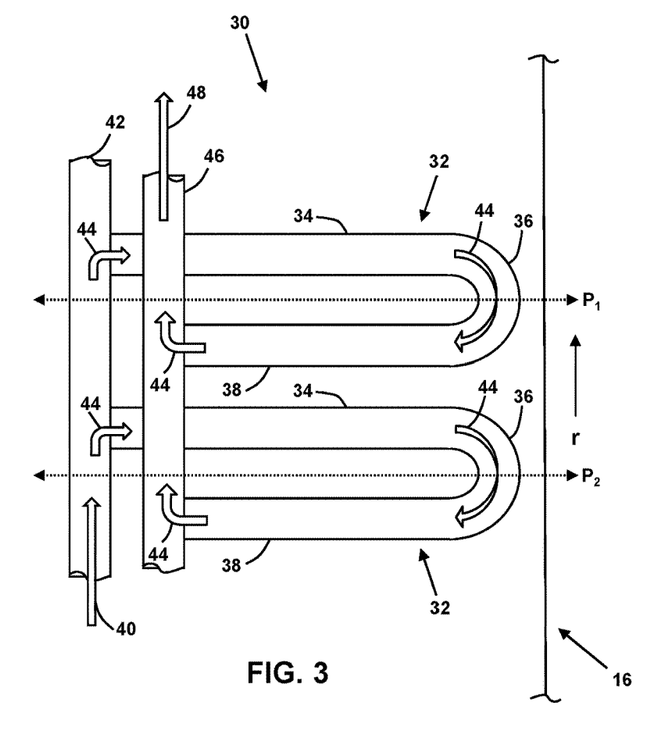
FIG. 3 is a side view of a portion of a trailing edge cooling circuit according to various embodiments.
Figures 4, 5:
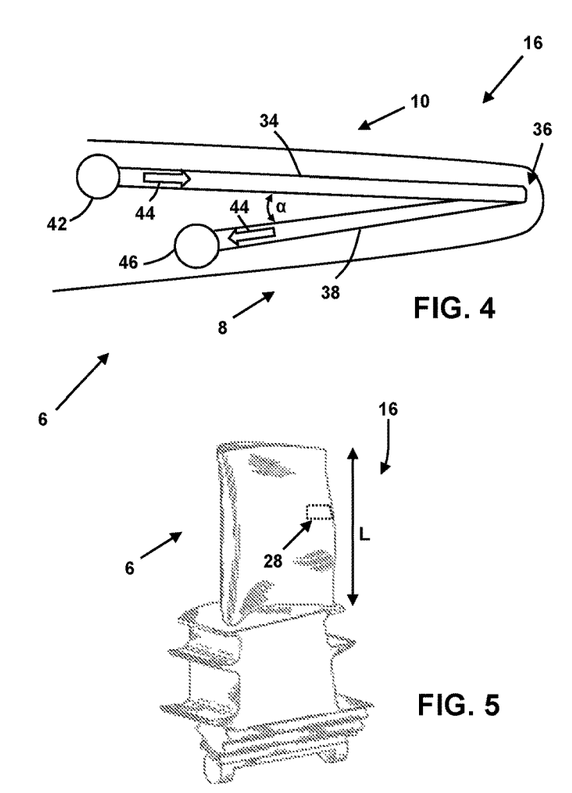
FIG. 4 is a top cross-sectional view of the trailing edge cooling circuit of FIG. 3 according to various embodiments.
FIG. 5 depicts the section shown in FIGS. 3 and 4 of the multi-wall blade of FIG. 1 according to various embodiments.

An embodiment including a trailing edge cooling circuit 30 is depicted in FIGS. 3-5. As the name indicates, the trailing edge cooling circuit 30 is located adjacent the trailing edge 16 of the multi-wall blade 6, between the pressure side 8 and suction side 10 of the multi-wall blade 6.

The trailing edge cooling circuit 30 includes a plurality of radially spaced (i.e., along the "r" axis (see, e.g., FIG. 1)) cooling circuits 32 (only two are shown), each including an outward leg 34, a turn 36, and a return leg 38. The outward leg 34 extends axially toward the trailing edge 16 of the multi-wall blade 6. The return leg 38 extends axially toward the leading edge 14 of the multi-wall blade. The outward and return legs 34, 38 may follow the contour of the suction and pressure sides 10, 8 of the multi-wall blade 6. In embodiments, the trailing edge cooling circuit 30 may extend along the entire radial length L (FIG. 5) of trailing edge 16 of the multi-wall blade 6. In other embodiments, the trailing edge cooling circuit 30 may partially extend along one or more portions of the trailing edge 16 of the multi-wall blade 6.

In each cooling circuit 32, the outward leg 34 is radially offset along the "r" axis relative to the return leg 38 by the turn 36. To this extent, the turn 36 fluidly couples the outward leg 34 of the cooling circuit 32, which is disposed at a first radial plane $P_1$, to the return leg 38 of the cooling circuit 32, which is disposed in a second radial plane $P_2$, different from the first radial plane $P_1$. In the non-limiting embodiment shown in FIG. 3, for example, the outward leg 34 is positioned radially outward relative to the return leg 36 in each of the cooling circuits 32. In other embodiments, in one or more of the cooling circuits 32, the radial positioning of the outward leg 34 relative to the return leg 38 may be reversed such that the outward leg 34 is positioned radially inward relative to the return leg 36. A non-limiting position 28 of the portion of the trailing edge cooling circuit 30 depicted in FIG. 3 within the multi-wall blade 6 is illustrated in FIG. 5.

As shown in FIG. 4, in addition to a radial offset, the outward leg 34 may be circumferentially offset by the turn 36 at an angle α relative to the return leg 38. In this configuration, the outward leg 34 extends along the suction side 10 of the multi-wall blade 6, while the return leg 38 extends along the pressure side 8 of the multi-wall blade 6. In other embodiments, the outward leg 34 may extend along the pressure side 8 of the multi-wall blade 6, while the return leg 38 may extend along the suction side 10 of the multi-wall blade 6. The radial and circumferential offsets may vary, for example, based on geometric and heat capacity constraints on the trailing edge cooling circuit 30 and/or other factors. The circumferential offset may be the same for each cooling circuit 32 or may change based, for example, on the radial position of the cooling circuit 32 in the trailing edge 16 of the multi-wall blade.

A flow of cooling air 40 (or other suitable: coolant), generated for example by a compressor 104 of a gas turbine system 102 (FIG. 10), flows into the trailing edge cooling circuit 30 via at least one coolant feed 42 (e.g., cool air feed 42). In general, any suitable type of coolant may be used. Each cool air feed 42 may be formed, for example, using one of the trailing edge passages 24 depicted in FIG. 2 or may be provided using any other suitable source of cooling air in the multi-wall blade 6. At each cooling circuit 32, a portion 44 of the flow of cooling air 40 passes into the outward leg 34 of the cooling circuit 32 and flows towards the turn 36. The flow of cooling air 44 is redirected (e.g., reversed) by the turn 36 of the cooling circuit 32 and flows into the return leg 38 of the cooling circuit 32. The portion 44 of the flow of cooling air 40 passing into each outward leg 34 may be the same for each cooling circuit 32, or may be different for different sets (i.e., one or more) of the cooling circuits 32.

According to embodiments, the flows of cooling air 44 from a plurality of the cooling circuits 32 of the trailing edge cooling circuit 30 flow out of the return legs 38 of the cooling circuits 32 into a collection passage 46. A single collection passage 46 may be provided, however multiple collection passages 46 may also be utilized. The collection passage 46 may be formed, for example, using one of the trailing edge passages 24 depicted in FIG. 2 or may be provided using one or more other passages within the multi-wall blade 6. Although shown as flowing radially outward through the collection passage 46 in FIG. 3, the "used" cooling air may instead flow radially inward through the collection passage 46.

The cooling air 48, or a portion thereof, flowing into and through the collection passage 46 may be directed (e.g. using one or more passages (e.g., passages 18-24) and/or passages within the multi-wall blade 6) to one or more additional cooling circuits of the multi-wall blade 6. To this extent, at least some of the remaining heat capacity of the cooling air 48 is exploited for cooling purposes instead of being inefficiently expelled from the trailing edge 16 of the multi-wall blade 6.

The cooling air 48, or a portion thereof, may be used to provide film cooling to various areas of the multi-wall blade. For example, as depicted in FIGS. 1 and 2, the cooling air 48 may be used to provide cooling film 50 to one or more of the pressure side 8, suction side 10, pressure side platform 5, suction side platform 7, and tip area 52 of the multi-wall blade 6.

The cooling air 48, or a portion thereof, may also be used in a multi-passage (e.g., serpentine) cooling circuit in the multi-wall blade 6. For example, the cooling air 48 may be fed into a serpentine cooling circuit formed by a plurality of the pressure side passages 20, a plurality of suction side passages 22, a plurality of the trailing edge passages 24, or combinations thereof. An illustrative serpentine cooling circuit 54 formed using a plurality of the trailing edge passages 24 is depicted in FIG. 2. In the serpentine cooling circuit 54, at least a portion of the cooling air 48 flows in a first radial direction (e.g., out of the page) through a trailing edge passage 24, in an opposite radial direction (e.g., into the page) through another trailing edge passage 24, and in the first radial direction through yet another trailing edge passage 24. Similar serpentine cooling circuits 54 may be formed using the pressure side passages 20, the suction side passages 22, the central passages 26, or combinations thereof.

The cooling air 48 may also be used for impingement cooling, or together with pin fins. For example, in the non-limiting example depicted in FIG. 2, at least a portion of the cooling air 48 may be directed to a central passage 26, through an impingement hole 56, and onto a forward surface 58 of a leading edge passage 18 to provide impingement cooling of the leading edge 14 of the multi-wall blade 6. Other uses of the cooling air 48 for impingement are also envisioned. At least a portion of the cooling air 48 may also be directed through a set of cooling pin fins 60 (e.g., within a passage (e.g., a trailing edge passage 24)). Many other cooling applications employing the cooling air 48 are also possible.

Figure 6:
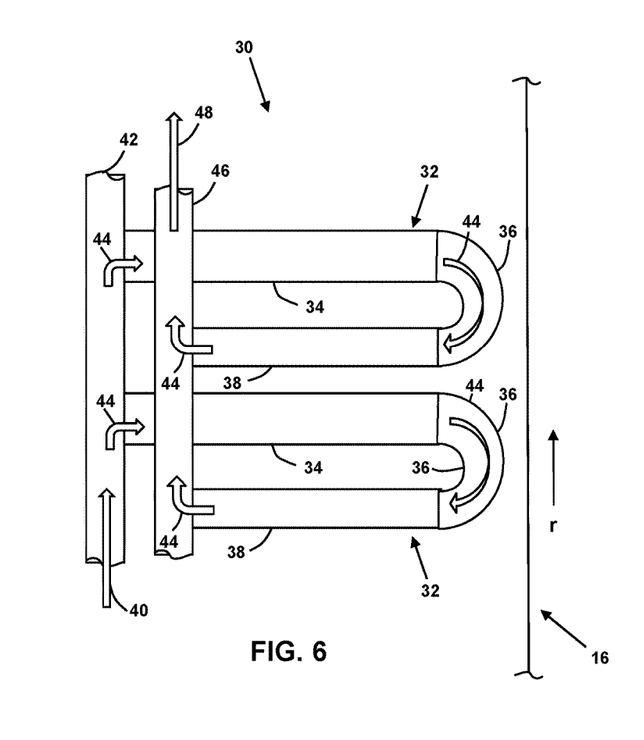
FIG. 6 is a side view of a portion of a trailing edge cooling circuit according to various embodiments.
Figure 7:
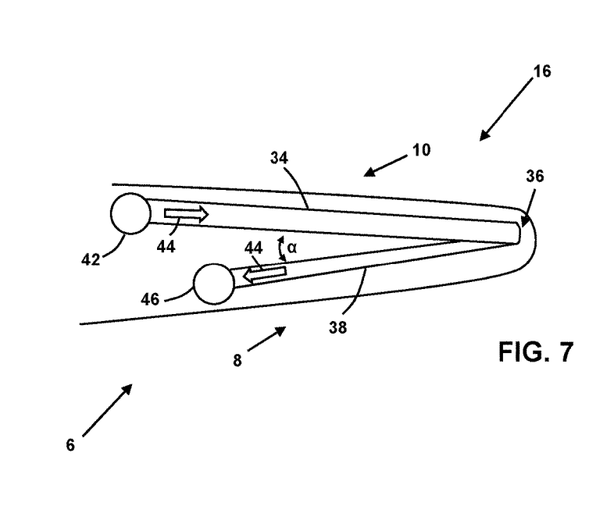
FIG. 7 is top cross-sectional view of the trailing edge cooling circuit of FIG. 6 according to various embodiments.

In embodiments, the outward and return legs 34, 38 of one or more of the cooling circuits 32 in the trailing edge cooling circuit 30 may have different sizes. For example, as depicted in FIGS. 6 and 7, the outward leg 34 in each cooling circuit 32 may be larger (e.g., to enhance heat transfer) than that of the return leg 38. The size of the outward leg 34 may be increased, for example, by increasing at least one of the radial height or the lateral width of the outward leg 34. In other embodiments, the outward leg 34 may be smaller than the return leg 38.

Figure 8:
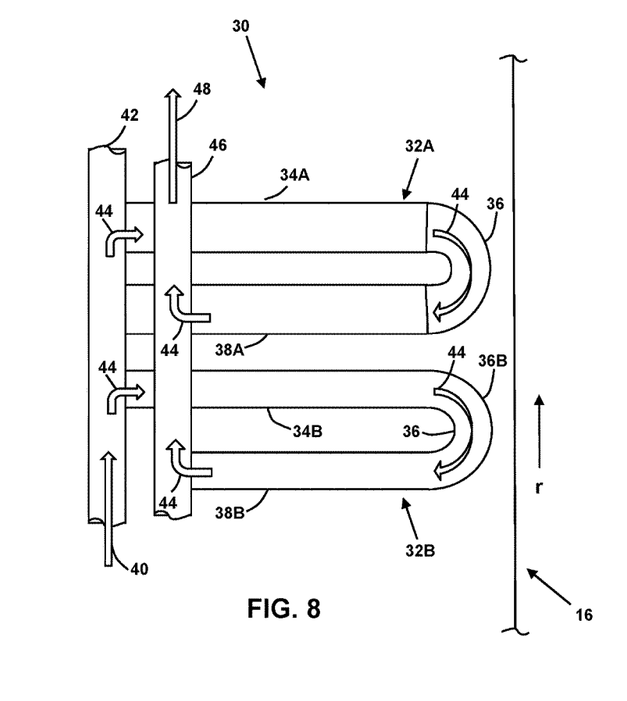
FIG. 8 is a side view of a portion of a trailing edge cooling circuit according to various embodiments.

In further embodiments, the sizes of the outward leg 34 and return leg 38 in the cooling circuits 32 in the trailing edge cooling circuit 30 may vary, for example, based on the relative radial position of the cooling circuits 32 within the trailing edge 16 of the multi-wall blade 6. For example, as depicted in FIG. 8, the outward leg 34A and the return leg 38A of the radially outward cooling circuit 32A may be larger in size (e.g., to enhance heat transfer) than the outward leg 34B and the return leg 38B, respectively, of the cooling circuit 32B.

Figure 9:
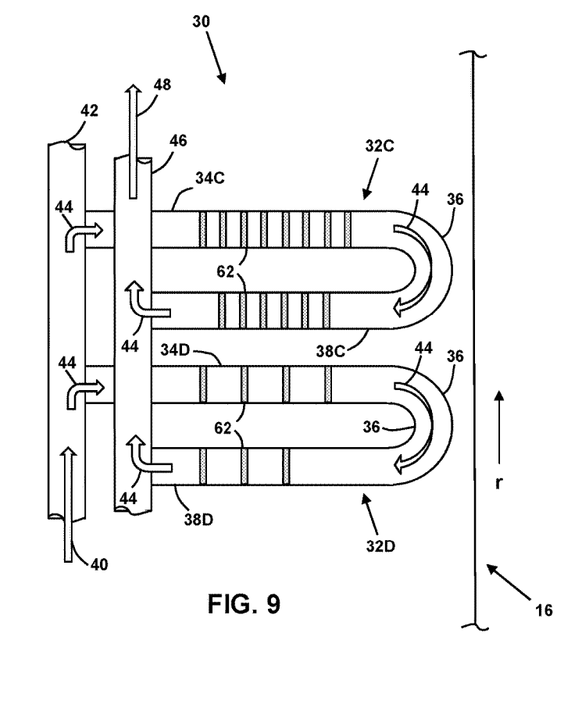
FIG. 9 is a side view of a portion of a trailing edge cooling circuit according to various embodiments.

In additional embodiments, obstructions may be provided within at least one of the outward leg 34 or return leg 38 in at least one of the cooling circuits 32 in the trailing edge cooling circuit 30. The obstructions may include, for example, metal pins, bumps, fins, plugs, and/or the like. Further, the density of the obstructions may vary based on the relative radial position of the cooling circuits 32 within the multi-wall blade 6. For example, as depicted in FIG. 9, a set of obstructions 62 may be provided in the outward leg 34C and the return leg 38C of the radially outward cooling circuit 32C, and in the outward leg 34D and the return leg 38D of the cooling circuit 32D. The density of the obstructions 62 may be higher (e.g., to enhance heat transfer) in the outward legs 34C, 34D compared to the density of obstructions 62 in the return legs 38C, 38D, respectively. Further, the relative density of the obstructions 62 may be higher (e.g., to enhance heat transfer) in the radially outward cooling circuit 32C compared to the cooling circuit 32D.

Figure 10:
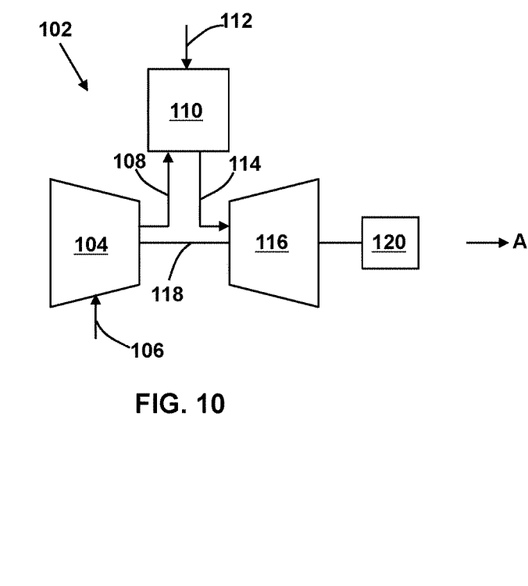
FIG. 10 is a schematic diagram of a gas turbine system according to various embodiments.

FIG. 10 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbine system 102 may include any number of combustors 110. The flow of combustion gases 114 is in turn delivered to a turbine 116, which typically includes a plurality of the turbine blades 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

To provide additional cooling of the trailing edge of multi-wall airfoil/blade and/or to provide cooling film directly to the trailing edge, exhaust passages (not shown) may pass from any part of any of the cooling circuit(s) described herein through the trailing edge and out of the trailing edge and/or out of a side of the airfoil/blade adjacent to the trailing edge. Each exhaust passage(s) may be sized and/or positioned within the trailing edge to receive only a portion (e.g., less than half) of the coolant flowing in particular cooling circuit(s). Even with the inclusion of the exhaust passages(s), the majority (e.g., more than half) of the coolant may still flow through the cooling circuit(s), and specifically the return leg thereof, to subsequently be provided to distinct portions of multi-wall airfoil/blade for other purposes as described herein, e.g., film and/or impingement cooling.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding). Fluidly coupled refers to a coupling through which a fluid can flow.

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A trailing edge cooling system for a multi-wall blade, comprising:
   a coolant feed passage;
   a coolant collection passage; and
   a plurality of cooling circuits, each of the plurality of cooling circuits including:
      an outward leg channel extending toward a trailing edge of the multi-wall blade and fluidly coupled to the coolant feed passage, the outward leg channel configured to receive a flow of coolant from the coolant feed passage;
      a return leg channel extending away from the trailing edge of the multi-wall blade and fluidly coupled to the coolant collection passage; and
      a turn channel for fluidly coupling the outward leg channel and the return leg channel;
      wherein the return leg channel is configured to direct all of the flow of coolant into the coolant collection passage,
      wherein the outward leg channel is radially offset from the return leg channel along a radial axis of the multi-wall blade,
      wherein, for at least one of the plurality of cooling circuits, the return leg channel is circumferentially offset relative to the outward leg channel, and
      wherein, for at least one of the plurality of cooling circuits, the outward leg channel extends solely along a suction side of the multi-wall blade and the return leg channel extends solely along a pressure side of the multi-wall blade, or wherein the outward leg channel extends solely along the pressure side of the multi-wall blade and the return leg channel extends solely along the suction side of the multi-wall blade.

2. The trailing edge cooling system according to claim 1, wherein the coolant collection passage is fluidly coupled to at least one other cooling circuit of the multi-wall blade.

3. The trailing edge cooling system according to claim 2, wherein the at least one other cooling circuit provides at least one of film cooling, convection cooling, or impingement cooling.

4. The trailing edge cooling system according to claim 1, wherein, for at least one of the plurality of cooling circuits, the radial offset of the outward leg channel from the return leg channel is selected from the group consisting of: radially outward from the return leg channel and radially inward from the return leg channel.

5. The trailing edge cooling system according to claim 1, wherein, for at least one of the plurality of cooling circuits, the return leg channel is a different size than the outward leg channel.

6. The trailing edge cooling system according to claim 1, wherein the plurality of the cooling circuits extend at least partially along a radial length of the trailing edge of the multi-wall blade.

7. The trailing edge cooling system according to claim 1, wherein, for at least one of the plurality of cooling circuits, a size of the outward leg channel and a size of the return leg channel vary according to a radial position of the cooling circuit in the trailing edge of the multi-wall blade.

8. A multi-wall turbine blade, comprising:
   a trailing edge cooling system disposed within the multi-wall turbine blade, the trailing edge cooling system comprising:
      a coolant feed passage;
      a coolant collection passage; and
      a plurality of cooling circuits extending at least partially along a radial length of a trailing edge of the multi-wall blade, each of the plurality of cooling circuits including:
         an outward leg channel extending toward the trailing edge of the multi-wall blade and fluidly coupled to the coolant feed passage, the outward leg channel configured to receive a flow of coolant from the coolant feed passage;
         a return leg channel extending away from the trailing edge of the multi-wall blade and fluidly coupled to the coolant collection passage; and
         a turn channel for fluidly coupling the outward leg channel and the return leg channel;
         wherein the return leg channel is configured to direct all of the flow of coolant into the coolant collection passage,
         wherein the outward leg channel is radially offset from the return leg channel along a radial axis of the multi-wall blade, wherein, for at least one of the plurality of cooling circuits, the return leg channel is circumferentially offset relative to the outward leg channel, and wherein, for at least one of the plurality of cooling circuits, the outward leg channel extends solely along a suction side of the multi-wall blade and the return leg channel extends solely along a pressure side of the multi-wall blade, or wherein the outward leg channel extends solely along the pressure side of the multi-wall blade and the return leg channel extends solely along the suction side of the multi-wall blade.

9. The multi-wall turbine blade according to claim 8, wherein the coolant collection passage is fluidly coupled to at least one other cooling circuit in the multi-wall blade.

10. The multi-wall turbine blade according to claim 9, wherein the at least one other cooling circuit provides at least one of film cooling, convection cooling, or impingement cooling.

11. The multi-wall turbine blade according to claim 8, wherein, for at least one of the plurality of cooling circuits, the radial offset of the outward leg channel from the return leg channel is selected from the group consisting of: radially outward from the return leg channel and radially inward from the return leg channel.

12. The multi-wall turbine blade according to claim 8, wherein, for at least one of the plurality of cooling circuits, the return leg channel is a different size than the outward leg channel.

13. The multi-wall turbine blade according to claim 8, wherein, for at least one of the plurality of cooling channels, a size of the outward leg channel and a size of the return leg vary according to a radial position of the cooling circuit in the trailing edge of the multi-wall blade.

14. A turbomachine, comprising:
a gas turbine system including a compressor component, a combustor component, and a turbine component, the turbine component including a plurality of turbine blades, at least one of the turbine blades including a multi-wall blade; and a trailing edge cooling system disposed within the multi-wall blade, the trailing edge cooling system including:
a coolant feed passage;
a coolant collection passage; and
a plurality of cooling circuits extending at least partially along a radial length of a trailing edge of the multi-wall blade, each of the plurality of cooling circuits including:
an outward leg channel extending toward the trailing edge of the multi-wall blade and fluidly coupled to the coolant feed passage, the outward leg channel configured to receive a flow of coolant from the coolant feed passage;
a return leg channel extending away from the trailing edge of the multi-wall blade and fluidly coupled to the coolant collection passage; and
a turn channel for fluidly coupling the outward leg channel and the return leg channel;
wherein the return leg channel is configured to direct all of the flow of coolant into the coolant collection passage,
wherein the outward leg channel is radially offset from the return leg channel along a radial axis of the multi-wall blade, and the outward leg channel is circumferentially offset relative to the return leg channel, and
wherein, for at least one of the plurality of cooling circuits, the outward leg channel extends solely along a suction side of the multi-wall blade and the return leg channel extends solely along a pressure side of the multi-wall blade, or wherein the outward leg channel extends solely along the pressure side of the multi-wall blade and the return leg channel extends solely along the suction side of the multi-wall blade.

15. The turbomachine of claim 14, wherein the coolant collection passage is fluidly coupled to at least one other cooling circuit in the multi-wall blade.

* * * * *